(12) United States Patent  
Bartlett

(10) Patent No.: US 6,776,720 B2  
(45) Date of Patent: Aug. 17, 2004

(54) TRIPODE CONSTANT VELOCITY JOINT

(75) Inventor: Stephen Charles Bartlett, Bridgnorth (GB)

(73) Assignee: GKN Technology, Ltd., Wolverhampton (GB)

( * ) Notice: Subject to any disclaimer, the term of this patent is extended or adjusted under 35 U.S.C. 154(b) by 0 days.

(21) Appl. No.: 10/181,406

(22) PCT Filed: Feb. 1, 2001

(86) PCT No.: PCT/GB01/00400

§ 371 (c)(1),
(2), (4) Date: Oct. 16, 2002

(87) PCT Pub. No.: WO01/57411

PCT Pub. Date: Aug. 9, 2001

(65) Prior Publication Data

US 2003/0060291 A1 Mar. 27, 2003

(30) Foreign Application Priority Data

Feb. 4, 2000 (GB) .............................. PCT/GB00/00320

(51) Int. Cl.[7] .............................................. F16D 3/205
(52) U.S. Cl. ..................................... 464/111; 464/905
(58) Field of Search ......................... 464/111, 120–124, 464/905

(56) References Cited

U.S. PATENT DOCUMENTS

| | | | |
|---|---|---|---|
| 4,988,327 A | | 1/1991 | Orain |
| 5,391,013 A | * | 2/1995 | Ricks et al. ............ 464/111 X |
| 5,395,289 A | | 3/1995 | Damian |
| 6,033,311 A | * | 3/2000 | Bartlett ...................... 464/111 |

FOREIGN PATENT DOCUMENTS

| | | |
|---|---|---|
| EP | 0 861 992 | 9/1998 |
| WO | WO 97 25545 | 7/1997 |

* cited by examiner

Primary Examiner—Greg Binda

(57) ABSTRACT

A plunging, constant-velocity, tripode universal joint comprising a first rotary member (30) having three trunnions (31), a roller (34) having a cylindrical bore mounted on a spherical surface (32) on each trunnion so that the cylindrical bore engages the spherical surface and so that each roller can rotate, tilt and slide relative to its supporting trunnion, a second rotary member (40) having three grooves parallel to its rotary axis, each roller being engaged with one of the grooves, the engagement between each roller and track surfaces in its associated groove being at three points such that the orientation of the roller with respect to the second member is determined solely by said engagement and wherein when the joint is transmitting torque each roller (34) is only in contact with the track surface(s) (42, 43) through which the torque is being transmitted.

18 Claims, 5 Drawing Sheets

TRIPODE CONSTANT VELOCITY JOINT

TECHNICAL FIELD

This invention relates to shudderless, tripode, plunging, constant-velocity, universal joints.

One type of such a constant-velocity, universal joint comprises a first rotary member having a rotary axis, three trunnions extending from the first member, a roller mounted directly or indirectly on a spherical surface on each trunnion, such surface being provided by the trunnion itself or by a member rotatably mounted on the trunnion, the roller including a cylindrical bore which engages the spherical surface so that each roller can rotate, tilt and slide relative to its supporting trunnion, the centers of the spherical surfaces on all the trunnions lying in a plane perpendicular to said rotary axis, a second rotary member having a rotary axis, three grooves formed in said second rotary member so as to extend parallel to the rotary axis of the second rotary member, each roller being engaged with one of the grooves, the engagement between each roller and its associated groove being such that the orientation of the roller with respect to the second member is determined solely by said engagement. In such a joint there is relative radial movement between the spherical surface of the trunnion and the roller.

BACKGROUND ART

One known form of shudderless, plunging, tripode joint is shown in cross section in FIG. 1. Referring to this figure there is a spider or inner member 10 of the joint which has three trunnions, one of which is shown at 11. The trunnion has a part-spherical surface 12 which receives an inner roller 13 having a cylindrical bore 14. The inner roller 13 can slide and tilt relative to the trunnion and moves radially relative to the center of the trunnion when the joint is articulated and rotating. An outer roller 15 is mounted on the inner roller 13 to rotate relative thereto, there being a needle roller bearing 16 between the rollers 13 and 15. The parts of the roller assembly are kept together by two rings 17 and 18. The outer race of the joint is indicated at 19 and has three grooves, each groove being formed by a pair of opposed tracks one of which is shown at 20. The cross-sectional shape of each track is formed by two circular arcs which give a "Gothic arch" form and angular contacts between the track and the roller. The centers 21 of the spherical surfaces of all of the trunnions lie in a plane perpendicular to the rotary axis 21a of the spider.

When torque is to be transmitted from the outer race 19 to the spider 10 in an anticlockwise direction in FIG. 1, there is a reaction force F0 which acts from the trunnion to the inner roller 13 and thence to the outer roller 15. The force F0 is generally perpendicular to the rotary axis of the roller 13, ignoring friction. There is two-point contact between the roller 15 and the right-hand track 20 and the reaction forces are shown at F1 and F2. The roller 15 is able to rotate about the intersection of these forces at 22 and without further constraint would be unstable. Because the roller 15 is free to tilt about the intersection 22, in order for the roller to be stable it will also engage the left-hand track so that there will be one or more reaction forces such as F3 or F4 on the circumference of the roller and/or a force F5 on the upper surface of the roller which limits its tilting movement. These additional forces on the left-hand side of the roller are intermittent and are due to the fact that, as the trunnion 11 moves up and down through the roller bore 14, the position of the roller 15 relative to the outer race 19 can, in general, only be defined by two points of contact (i.e. those of the forces F1 and F2) instantaneously when the trunnion is in a certain position with respect to the roller so that other forces are generally required to determine the orientation of the roller. These intermittent other forces F3, F4 and F5 increase the resistance of the roller to rolling along the tracks and hence the plunge resistance of the joint, i.e the passive resistance. They may also cause the joint to generate a cyclic net axial force when it rotates with the rotary axes of the spider and outer race misaligned, this can give rise to shudder vibration in a vehicle in which the joint forms part of the driveline.

A similar arrangement is shown in FIG. 2 except that in this case the trunnion 22 is cylindrical and an inner roller 23 provides the part-spherical outer surface 24 which engages a cylindrical bore 25 of the outer roller 26. The inner roller 23 is mounted on the trunnion by a needle roller bearing 27 and can not tilt or slide relative to the trunnion. The outer roller 26 can rotate, tilt or slide relative to the trunnion and to the part-spherical outer surface 24 which moves up and down within the bore 25. The forces on the roller 26 are similar to those described in relation to the joint shown in FIG. 1 and are shown by the same reference characters.

Because in each of the above examples the rollers 15 and 26 can tilt, slide and rotate relative to the trunnions and because the rollers are "shaped" to fit the grooves, the orientation of each roller with respect to its associated groove is determined solely by the engagement of the roller with the groove. There are other configurations of tripode joints in which the orientation of each roller relative to the outer race is determined by the engagement of the roller with the groove.

There is described in WO 97/25545 a further type of tripode shudderless joint and reference is made particularly to FIG. 17. In this joint, the tripode trunnions are cylindrical and mounted on each trunnion by needle roller bearings is an inner roller with a part-spherical outer surface. This engages an outer roller with an inner spherical-surface. The outer roller can tilt with respect to the inner roller but any sliding radial movement takes place between the trunnion and the inner roller. The outer spherical surface does not move radially with respect to the outer roller so that, unlike the joint of the current invention as will be described below, the force between the trunnion and the roller assembly acts at a fixed position relative to the roller assembly. Therefore there may be no tendency for the roller assembly to twist about an axis parallel to the axis of the second member.

In the prior joint the outer roller has a trapezoidal outer surface which engages a track surface of corresponding shape. It is suggested that contact may take place between three faces of the outer roller and the track but this would seem to require a very accurate fit between roller and track. This is acknowledged by the fact that the roller and track inclined surfaces are described as facing one another with "a gapless contact or a very small gap". In practice the two trapezoids will generally only be in contact on one or two of their sides.

WO 97/25545 also describes how the rollers are only in contact with the track surface through which torque is being transmitted. This may be achieved by making the driving track (i.e. the track through which torque is transmitted) narrower than the other track. This results in asymmetric grooves and a requirement for different components to be used on the left and right hand sides of a vehicle.

SUMMARY OF THE INVENTION

An object of the present invention is to reduce the resistance of the rollers to rolling along the tracks and thus to reduce the plunge resistance whilst ensuring that the rollers are stable and that there is continuous three-point contact between the roller and the track, without requiring the profiles of the roller and the track to be matched with extreme accuracy.

Another object of the invention is to provide a shudderless, tripode joint in which the stability of each roller is determined solely by its engagement with the driving track and there are no intermittent contacts between the roller and the other track.

Another object of the invention is to reduce the NVH (noise, vibration, harshness) associated with clearance in the joint by damping the backlash movement of the roller when the torque is reversed.

Another object of the invention is to provide a joint in which the grooves to receive the rollers have a simple form making the second rotary member or outer race easy to manufacture.

Another object of the invention is to provide a joint in which the grooves are symmetrical.

Another object of the invention is to provide a joint in which all the contacts between the roller and the track are Hertzian (as hereinafter described);

According to one aspect of the invention we provide a plunging, constant-velocity universal joint comprising a first rotary member having a rotary axis, three trunnions extending from the first member, a roller mounted directly or indirectly on a spherical surface on each trunnion, such surface being provided by the trunnion itself or by a member rotatably mounted on the trunnion, the roller including a cylindrical bore which engages the spherical surface so that each roller can rotate, tilt and slide relative to its supporting trunnion, the centers of the spherical surfaces on all the trunnions lying in a plane perpendicular to said rotary axis, a second rotary member having a rotary axis, three grooves formed in said second rotary member so as to extend parallel to the rotary axis of the second rotary member, each groove comprising spaced-apart track surfaces which extend parallel to the rotary axis of the second member, each roller being engaged with a track surface in one of the grooves, the engagement between each roller and its associated track surface through which torque is being transmitted being at three points which hilly determine the roller's orientation with respect to the second member and wherein, when the joint is transmitting torque, each roller is only in contact with the track surface through which the torque is being transmitted.

According to another aspect of the invention we provide a plunging, constant-velocity universal joint comprising a first rotary member having a rotary axis, three trunnions extending from the first member, a roller mounted directly or indirectly on a spherical surface on each trunnion, such surface being provided by the trunnion itself or by a member rotatably mounted on the trunnion, the roller including a cylindrical bore which engages the spherical surface so that each roller can rotate, tilt and slide relative to its supporting trunnion, the centers of the spherical surfaces on all the trunnions lying in a plane perpendicular to said rotary axis, a second rotary member having a rotary axis, three grooves formed in said second rotary member so as to extend parallel to the rotary axis of the second rotary member, each groove comprising spaced-apart track surfaces which extend parallel to the rotary axis of the second member, each roller being engaged with a track surface in one of the grooves, the engagement between each roller and its associated track surface through which torque is being transmitted being at three points which fully determine the roller's orientation with respect to the second member, wherein the contact vectors of the reaction forces at said three points, when projected on to a common plane perpendicular to the rotary axis of the second member, form a triangle, wherein the contact vector of the force between the roller and the spherical surface, when projected onto said common plane, intersects the two sides of the triangle formed by the projected contact vectors of the reaction forces acting at a radially innermost and radially outermost of said points, the radial positions of said points being measured with respect to the rotary axis of the second member and wherein, when the joint is transmitting torque, each roller is only in contact with the track surface through which the torque is being transmitted.

Preferably the track surfaces in each groove are symmetrical with respect to a plane (the plane of symmetry) containing the rotary axis of the second member.

Preferably two of said contact vectors of the reaction forces when projected on to said common plane intersect on the plane of symmetry, said two contact vectors being one of the reaction forces acting at the radially innermost or radially outermost of said points and the contact vector of the reaction force acting at the radially intermediate point.

A first track surface on which the radially innermost point or the radially outermost point and the radially intermediate point is situated may be cylindrical. Said first track surfaces on each side of the groove may be parts of the same cylinder.

The radially innermost or radially outermost point which is not on the first track surface may be on a second track surface which is cylindrical. The first and second track surfaces may have a common tangent where they meet.

When the joint is transmitting torque the rotary axis of each roller may be tilted with respect to the plane of symmetry of its associated tracks. Thus when the direction of torque transfer through the joint reverses, each roller moves into contact with a track surface through which torque is then being transferred and tilts about an axis parallel to the rotary axis of the second member until its orientation is determined by said three-point contact. The tilt movement of each roller is preferably in a sense opposite to the direction of rotation of the first member after the direction of torque transfer has been reversed.

Each trunnion may have a part spherical surface engaged with a cylindrical bore of an inner rotary member on which the roller, is rotatably mounted. Alternatively each trunnion may have a cylindrical surface on which is rotatably mounted an inner rotary member having a spherical outer surface engaged with a cylindrical bore of the roller.

BRIEF DESCRIPTION OF THE DRAWINGS

The invention will now be described in detail by way of example with reference to the accompanying drawings in which.

DETAILED DESCRIPTION

Figure 3:
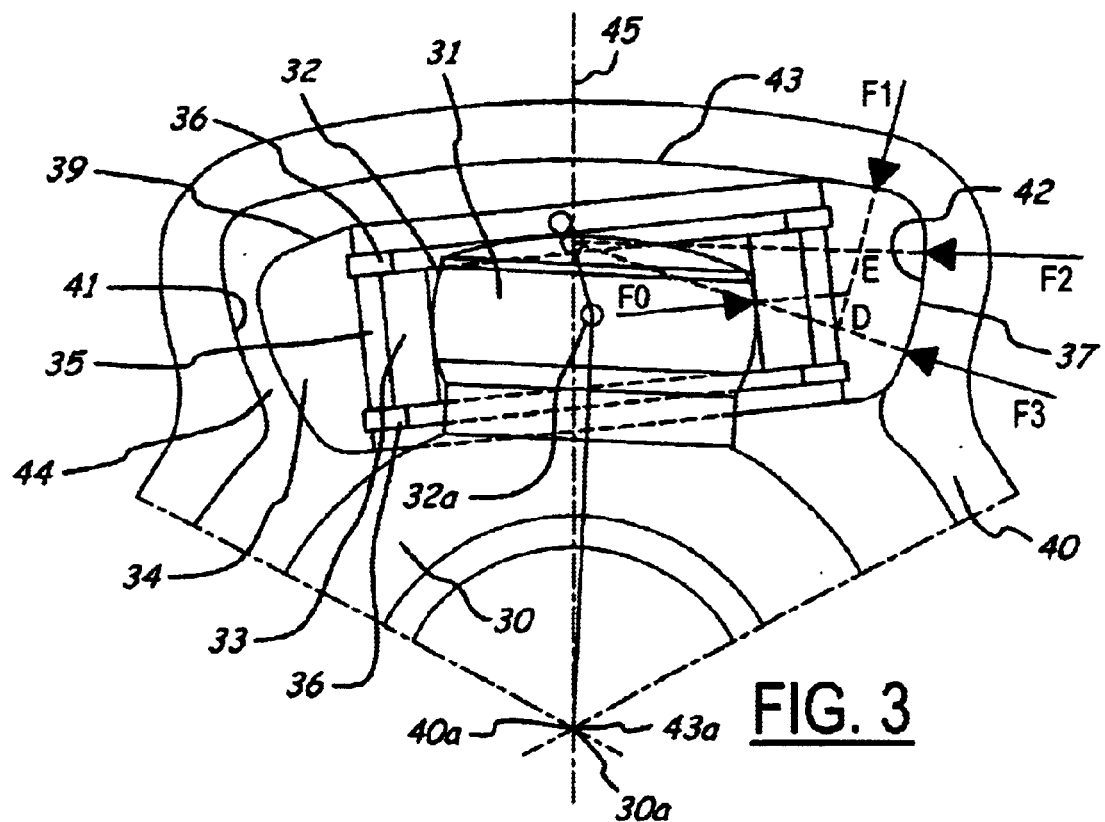
FIG. 3 is a cross-section through part of a joint constituting one embodiment of the invention.
Figure 7:
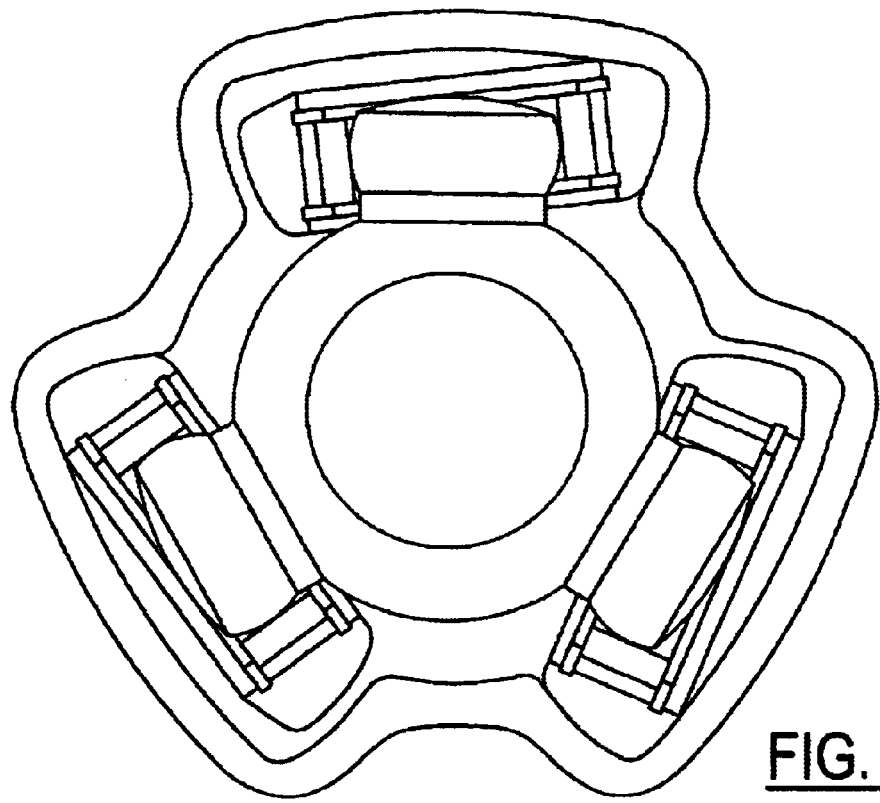
FIG. 7 is a cross section through a complete joint embodying the invention.

Referring now to FIG. 3, the inner member or spider of the joint is indicated at 30 and one of the trunnions at 31. The trunnion has a part-spherical external surface 32, the center of which is shown at 32*a*. There are three trunnions as shown in FIG. 7 and the centers of the spherical surfaces of all the trunnions lie in a plane perpendicular to the rotary axis 30*a* of the inner member. Mounted on each trunnion is an inner first roller 33 which has a cylindrical bare to engage the part-spherical surface 32. An outer roller is indicated at 34 and is mounted on the inner roller by a needle roller bearing 35 and retained in position by rings 36.

The outer race 40 of the joint has three grooves as shown in FIG. 7, each groove providing a pair of tracks, one pair of which is shown in FIG. 3, the track surfaces being indicated at 41 and 42. These surfaces form parts of the same cylinder but may be of other shapes. The tracks 41 and 42 are symmetrically arranged with respect to a plane (the plane of symmetry) containing the rotary axis of the outer race and the line 45. The root 43 of the track is also a cylindrical surface having its center at 43*a*. The tracks in the other grooves are similarly arranged. The outer race 40 has a rotary axis 40*a*.

As shown in FIG. 3 the outer roller 34 has an external circumferential surface 37 which engages the track 42 and a surface 39 which engages the root 43 so that there is three-point contact between the roller and the track surface 42 and the root 43. Thus assuming that torque is being transmitted from the trunnion 31 to the outer race 41 in a clockwise sense there is a force F0 between the spherical surface 32 and the inner roller 33 and two reaction forces F2 and F3 at the two points where the outer roller 34 engages the track 42. There is also a force F1 where the surface 39 at the top of the outer roller 34 engages part of the track root 43. The outer roller 34 is thus determined in its orientation by this three-point contact represented by the arrows F1, F2 and F3. The contact vectors, i.e. the lines of action, of the forces F2 and F3 if projected on to a common plane perpendicular to the rotary axis 30*a* (i.e., the drawing sheet plane) intersect at O, the center of curvature of the tracks 41 and 42. In other words, F2 and F3 intersect on a plane of symmetry containing the rotary axis of the outer race 40 and the line 45. In the absence of the force F1 the roller could rotate about: the point O and would be unstable. The force F1, if projected on to said common plane, intersects the projected contact vectors of the forces F2 and F3 at E and D respectively. The points O, D and E form a triangle and the contact vector, line of action, of the Force F0 (which acts through the center 32*a* of the spherical surface 32) intersects two sides of the triangle, i.e. OD and DE. This arrangement, described in more detail below ensures that the roller is stable and is maintained in position with its three point contact. It is to be noted that of the triangle sides intersected by the contact vector of the force P0 the side OD is the contact vector of the radially innermost force F3 and the line DE is the contact vector of the radially outermost force F1, where the radial positions are measured with respect to the rotary axis 30*a* of the second member. As long as the force F0, when projected on to said common plane, intersects side DE of the triangle ODE, contact is maintained at points associated with forces F2 and F3. In addition, as long as the force F0 also intersects side CD of the triangle ODE, the moment on the roller about point O ensures contact at the point associated with force F1. In other words, these conditions ensure that the values of forces F1, F2 and F3 are positive so that contact is maintained at these three points.

Each of the forces transmitted to the outer race 40 from a trunnion 31 and reacted by the forces F1, F2 and F3 have a tangential component acting in the positive torque-transmitting direction. The point forces are preferably Hertzian, i.e. there are at least two principal radii of curvature of the outer surface 37 and the track surface 42 which results in there being discrete elliptical contact areas.

Figure 1:
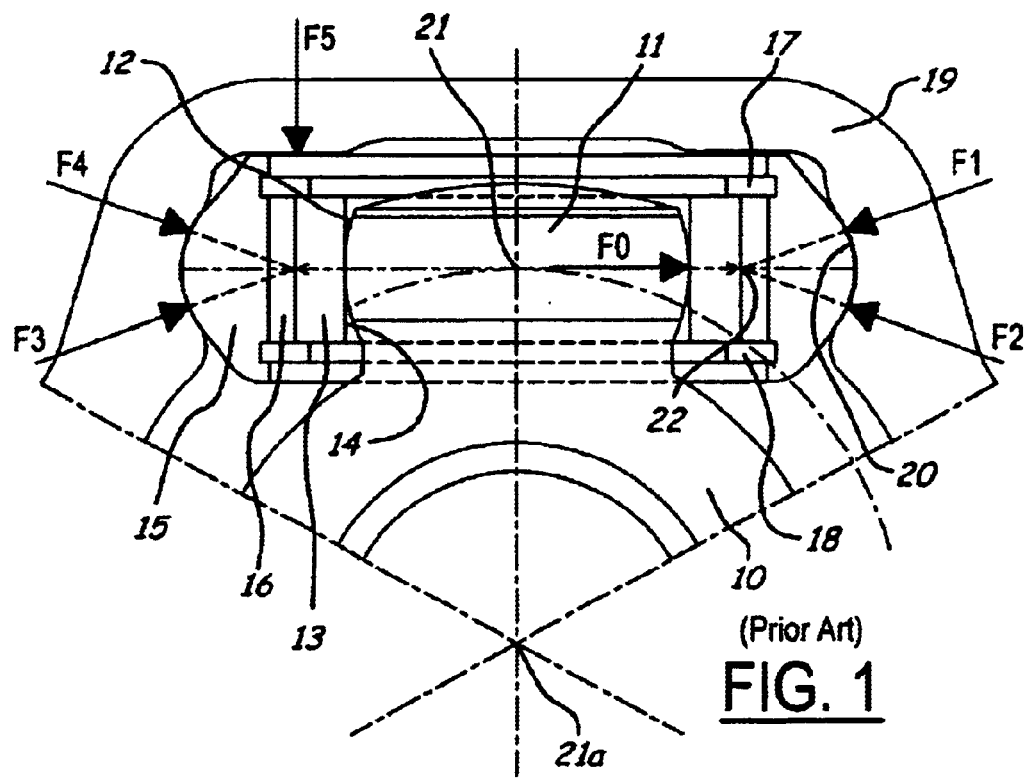
FIG. 1 shows a cross-section through part of a shudderless, plunging, tripode joint according to the prior art.

It will be seen that there is a clearance 44 (much exaggerated in the drawing) between the left-hand track 41 and the surface 37 of the outer roller 34. The outer roller 34 is therefore only in contact with the track through which torque is being transferred, i.e. in the drawing, the track which is to the right of the plane of symmetry of the tracks 41, 42. The whole of the circumference of the roller 34 therefore to the left of such plane is out of contact with the track 41 and there will be no intermittent contacts therewith as in FIGS. 1 and 2. The rotary axis of the outer roller 34 is not parallel to the line 45 which passes through the point 43*a*, the center of the root cylindrical surface 43, and the spherical center O. During operation of the joint the point of contact between the spherical surface 32 of the trunnion and the cylindrical bore of the roller 33 will move radially.

If the direction of torque transfer now reverses, the surface 37 of the roller 34 will come into engagement with the left-hand track 41 and the outer roller 34 will then tilt so that the left-hand portion of the surface 39 comes into contact with the root 43 of the track. The outer roller 34 will move out of contact with the track 42. This tilting of the outer roller 34 is in a direction opposite to the direction of rotation of the inner member 30 of the joint once the reversal of torque transmission has taken place. It is thought that this motion and the sliding of the outer roller 34 across the track 41, following the initial impact, will tend to absorb the energy of the impact and hence reduce the effects of backlash which can give rise to noise and vibration problems when the joint is installed in a vehicle.

Figure 4:
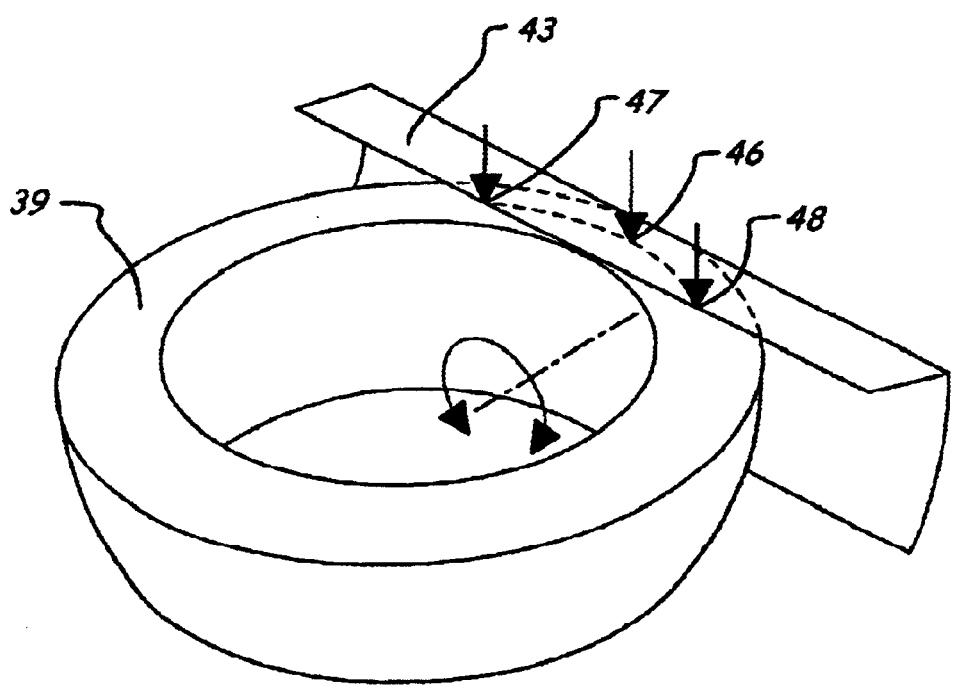
FIG. 4 is a diagram showing what happens when the roller skews.

If the outer roller 34 skews, i.e. rotates about an axis perpendicular to the roller axis and to the rotary axis of the outer member then, as shown in FIG. 4, the contact point between the surface 39 on the end of the outer roller 34 and the track root 43 is free to move from the position 46 to the position 47 or the position 48 or somewhere between these two positions. Movement of this contact point will limit the skew motion of the outer roller 34.

Figure 5A:
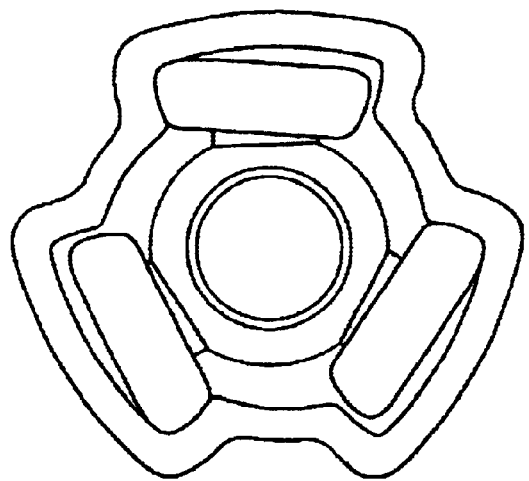
FIGS. 5a and 5b are diagrams showing the orientations of the three rollers when torque is being transmitted from the FIG. 6 is a cross-section similar to FIG. 3 of a second embodiment of the invention.
Figure 5B:
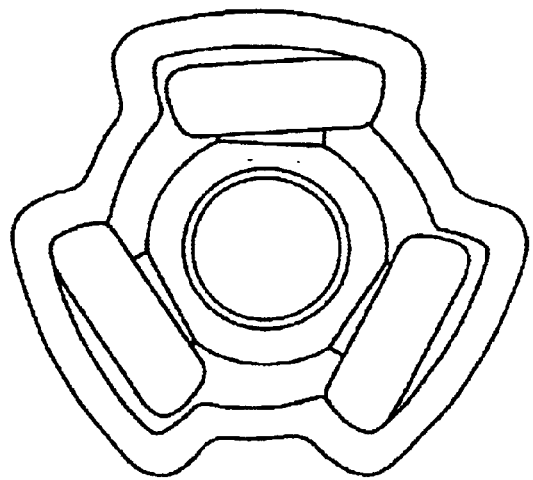

FIG. 5*a* shows the three rollers in their tilted orientations as torque is being transmitted from the outer member of the joint to the inner member in a clockwise sense and FIG. 5*b* shows the outer roller 34 orientations when torque is being transmitted in an anticlockwise sense. When the torque is reversed the rollers tilt in the direction opposite to the direction of rotation of the inner member 30 once reversal of torque has taken place and engage the tracks on the other sides of the grooves so that there is a clearance between those faces of the roller which are not transmitting torque and the tracks.

Figure 2:
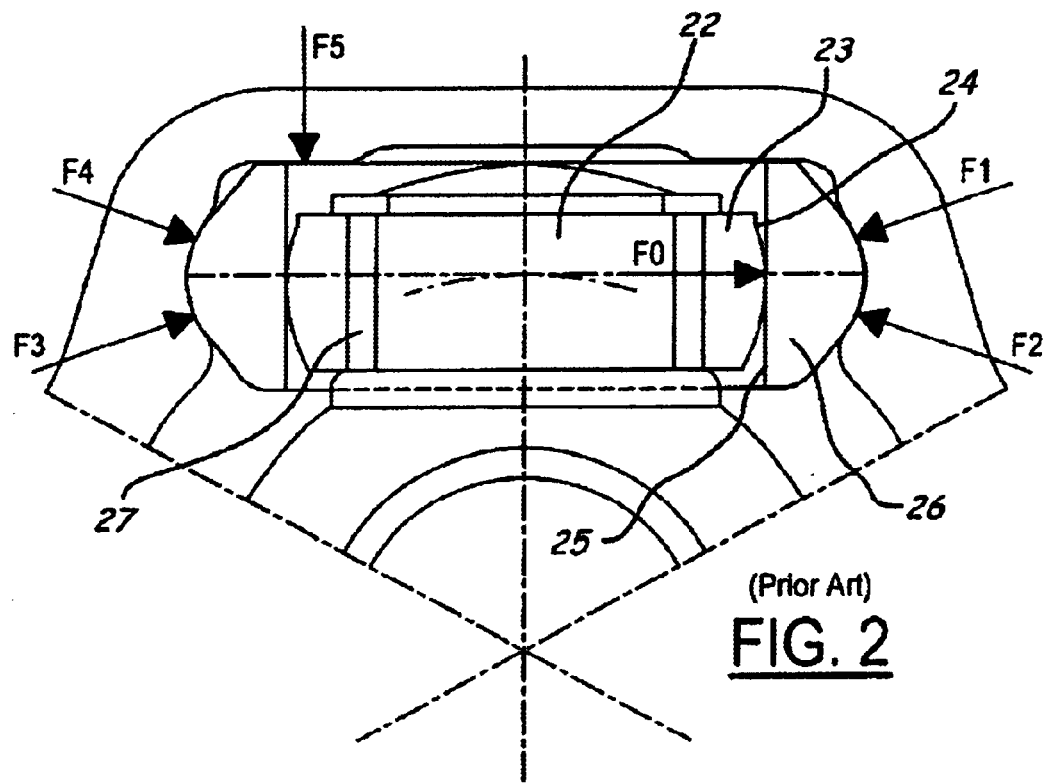
FIG. 2 shows a cross-section through part of another shudderless, plunging, tripode joint according to the prior art.
Figure 6:
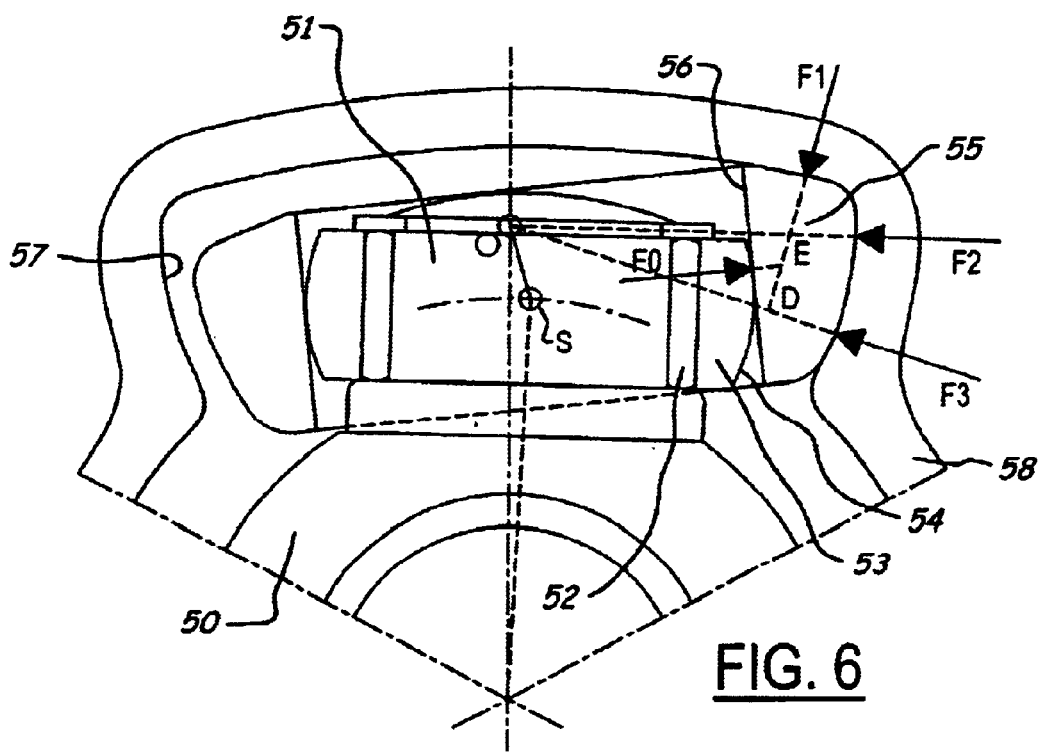

FIG. 6 shows a joint similar to FIG. 2 but which embodies the invention. Thus referring to FIG. 6 the inner member of the joint is indicated at 50 and a trunnion at 51. The trunnion is cylindrical and carries a needle roller bearing 52 which in turn carries an inner roller 53 having an external spherical surface 54. An outer roller 55 has a cylindrical bore 56 which engages the spherical surface 54.

The outer roller 55 is of the same shape as that described in relation to FIG. 3 as is the track 57 in the outer member 55 of the joint. Again there is three-point Hertzian contact indicated by the arrows F1, F2 and F3 and the operation of this joint is as described in relation to the joint of FIG. 3.

As in FIG. 3 the contact vectors of the forces F2 and F3, when projected on to a common plane perpendicular to the rotary axis of the second member intersect at O (i.e., the drawing plane), the center of curvature of the tracks 57. The contact vector of the force F1 when projected on to said common plane intersects the force vectors of the forces F2 and F3 at E and D and the points O, E and D are apices of a triangle. As shown the contact vector of the force F0 intersects the triangle sides OD and DE so that the roller 55 is in stable equilibrium under the influence of the forces F1, F2 and F3. As described in relation to FIG. 3 the sides OD and DE which are intersected by the contact vector of the force F0 (which acts through the center S of the spherical surface 54) are the contact vectors of the radially innermost force, F3, and the radially outermost force, F1. As in FIG. 3 also the roller is out of contact with the left-hand track 57.

Figure 8:
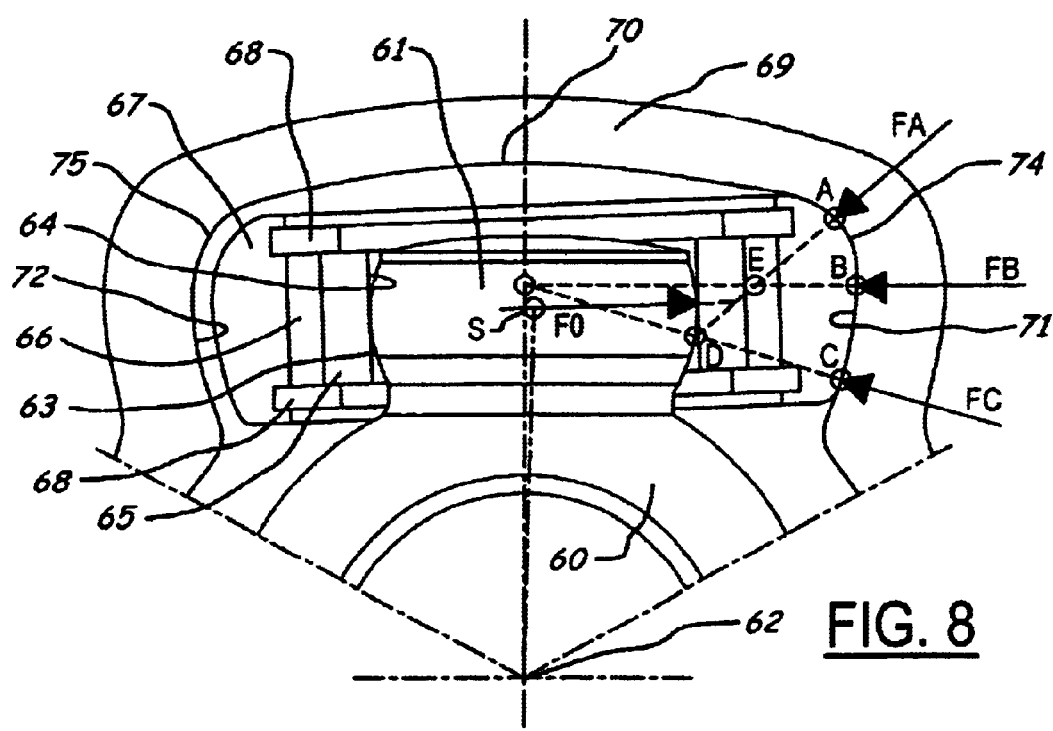
FIGS. 8, 9 and 10 are views similar to FIG. 3 of three further embodiments.

Referring now to FIG. 8, this shows a joint similar to that shown in FIG. 3 except that in this case the roller is not twisted. Thus the inner member of the joint is indicated at 60 and a trunnion at 61. There are three such trunnions equi-angularly spaced around the rotary axis 62 of the inner member. The trunnion has an outer spherical surface 63 which engages the cylindrical bore 64 of an inner roller 65. The inner roller 65 is surrounded by a ring of needle rollers 66 on which runs the outer roller 67, the whole being held together by circlips 68 as described in relation to FIG. 3.

The outer member is indicated at 69 and has three grooves as before one of which is shown at 70. Each groove has two tracks 71 and 72 which are formed of cylindrical surfaces and form part of the same cylinder the center of which is at O. There is a second cylindrical track surface on each side of the groove shown at 74 and 75 respectively. The surfaces 71 and 74 are co-tangential as are the surfaces 72 and 75.

As in FIG. 3, the outer roller 67 is in contact with the track surfaces 71 and 74 but is out of contact with the track surfaces 72 and 75. This assumes that torque is being transferred in an anticlockwise direction from the outer member 69 to the inner member 60.

The contact vector of the trunnion to roller force is shown at F0. There are three reaction forces FA, FB and FC which act at three points A, B and C respectively Point A is on the cylindrical surface 74 and points B and C are on the cylindrical surface 71.

The contact vectors of the forces FB and FC intersect at O, i.e. the axis of the cylindrical surfaces 71 and 72. If these force vectors are projected onto a common plane (the drawing plane) and the force vector of the force FA which acts at a point A on the cylindrical surface 74 is also projected onto the same common plane, one gets a triangle whose apices are O, E and D. It will be seen that the contact vector of the force F0 (which acts through the center S of the spherical surface 63) intersects the lines OD and DE. This is a necessary condition for the roller 67 to remain in three-point contact with the surfaces 71 and 74 at the points A, B and C. It will be noted as described above that the sides which are intersected by the contact vector of the force F0 are the sides formed by the contact vector of the radially innermost force, FC and of the radially outermost force, FA. The contact vector of the force P0 does not intersect the contact vector of the intermediate force FB.

If the direction of torque transfer through the joint reverses then the roller 67 will come into contact with the surfaces 72 and 75 and out of contact with the surfaces 71 and 74. It is to be noted that, ignoring friction, the contact vector force P0 acts through the center of the spherical surface 63.

Figure 9:
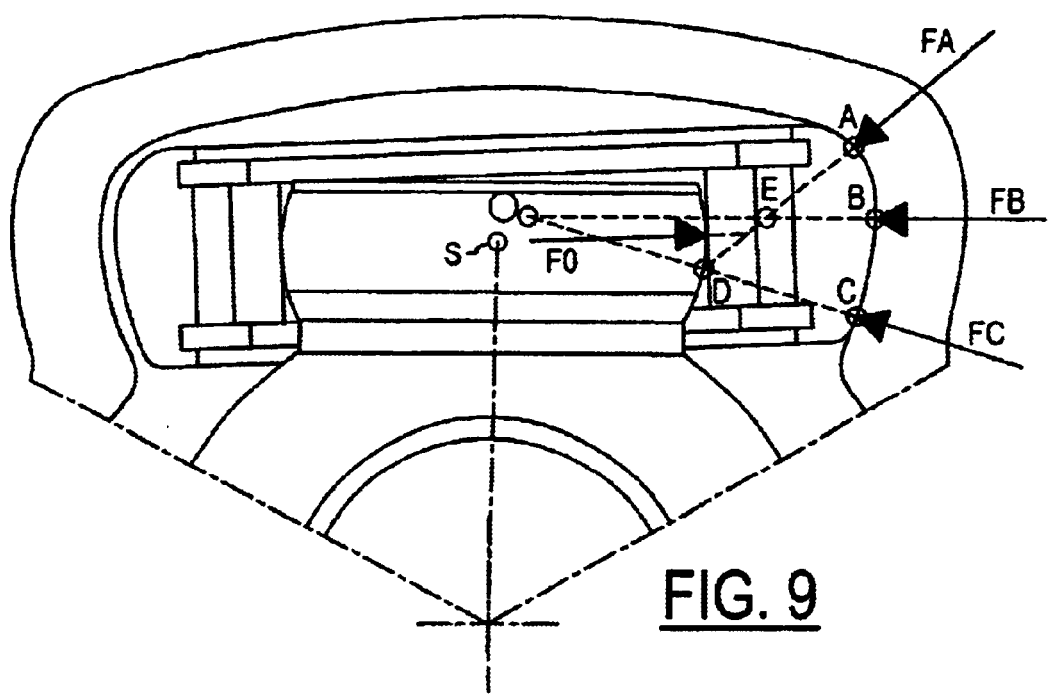

Like parts in FIGS. 8 and 9 are shown by the same reference numbers. FIG. 9 shows a similar arrangement to FIG. 8 except that in this case the intersection point O of the contact vectors of the forces FB and FC does not lie on the plane of symmetry of the tracks. As before, the contact vector of the force P0 intersects the sides OD and DE which are the sides of the triangle formed by the contact vectors of the radially innermost and outermost forces, i.e. FC and FA respectively, when the forces are projected on to a common plane perpendicular to the rotary axis of the outer member which is shown by the point 62 which is the same as the rotary axis of the inner member. It will be seen that in each of FIGS. 8 and 9 the intersection O of the forces FE and FC is at a point radially outwardly of the center of the spherical surface of the trunnion.

Figure 10:
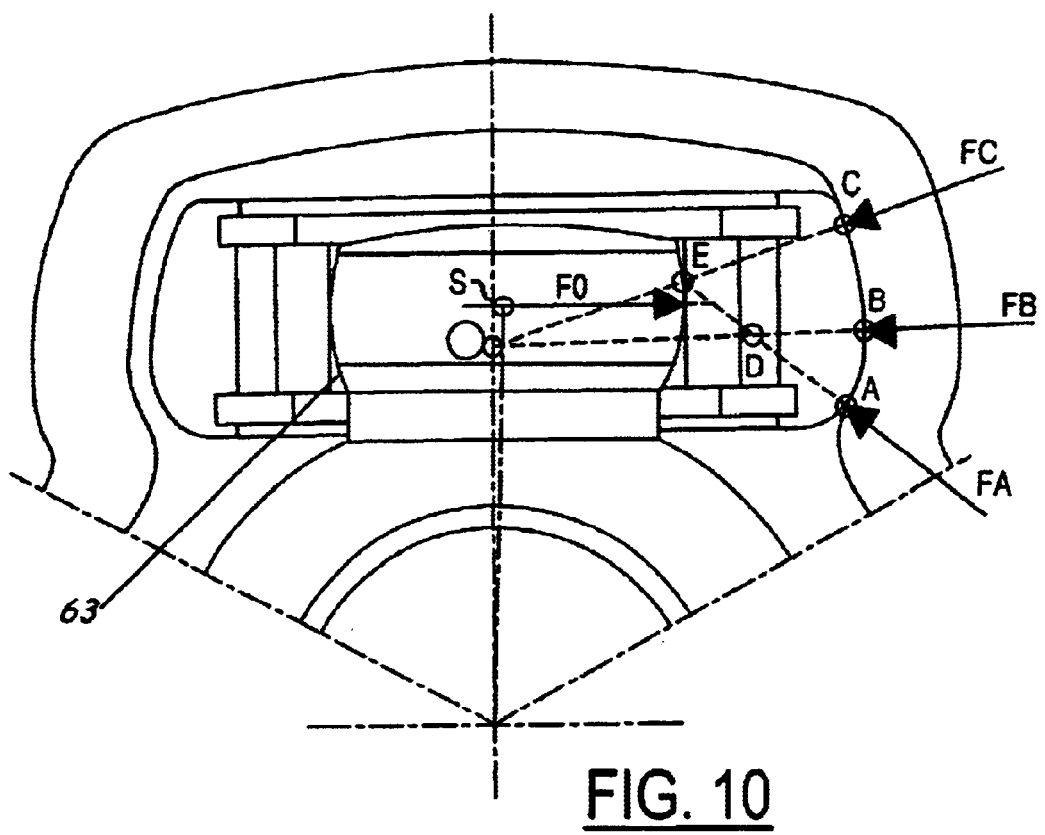

FIG. 10 shows a further arrangement in which the intersection O of the forces FC and FB is at a position which is radially inwardly of the center of the trunnion. In this embodiment, the point A, where the force FA acts, the force FA being that with the greatest roller-axial component, is located radially inwardly of the points B and C where the forces FB and FA act. In FIG. 10 like parts are indicated by the same reference numerals as in FIG. 8. In FIG. 10, ignoring friction, the contact vector of the force F0 acts through the centers of the spherical surface 63.

The contact vectors of the forces FB and FC act through the points B and C respectively and when projected on to a common plane perpendicular to the rotary axis of the outer member intersect at the point O which his radially inward from the centers of the trunnion sphere. In this case the contact vector of the force F0 intersects the sides OE and ED of the triangle. These sides are those provided by the radially outermost force FC and the radially innermost force FA. As before the contact force vector of the force F0 does not intersect the contact vector of the force FB.

Preferably at all the contact points A, B and C the contacts are Hertzian since the contact surfaces have at least two identifiable radii of curvature. In fact the contact at the points A, B and C have three radii of curvature, two associated with the roller 67 and one associated with the tracks 71, 74 and 72, 75. Such contacts should promote the ingress of lubricant into the contact zones and the resulting formation of a lubricant film should reduce the rolling resistance of the roller.

The invention thus provides a joint which fulfills the above-mentioned objects, has a low plunge resistance and low NVH.

What is claimed is:

1. A plunging, constant-velocity universal joint comprising:
    a first rotary member having a rotary axis;
    three trunnions extending from the first member, a roller mounted directly or indirectly on a spherical surface on each trunnion, such surface being provided by the trunnion itself or by a member rotatably mounted on the trunnion, the roller including a cylindrical bore which engages the spherical surface so that each roller can rotate, tilt and slide relative to its supporting trunnion, the centers of the spherical surfaces on all the trunnions lying in a plane perpendicular to said rotary axis; and a second rotary member having a rotary axis, three grooves formed in said second rotary member so as to extend parallel to the rotary axis of the second rotary member, each groove comprising spaced-apart non-trapezoidal track surfaces which extend parallel to the rotary axis of the second member, each roller being engaged with a track surface in one of the grooves, the engagement between each roller and its associated track surface through which torque is being transmitted being at three points which fully determine the roller's orientation with respect to the second member, and wherein, when the joint is transmitting torque, each roller is only in contact with the track surface through which the torque is being transmitted.

2. A joint according to claim 1 wherein the track surfaces in each groove are symmetrical with respect to a plane of symmetry containing the rotary axis of the second member.

3. A joint according to claim 1 wherein each trunnion has a part spherical surface engaged with a cylindrical bore of an inner rotary member on which the roller is rotatably mounted.

4. A joint according to claim 1 wherein each trunnion has a cylindrical surface on which is rotatably mounted an inner first roller having a spherical outer surface engaged with a cylindrical bore of the roller.

5. A joint according to claim 1 wherein all the contacts between a respective roller and its associated tracks have, between them, at least two identifiable radii of curvature where they touch.

6. A plunging, constant-velocity universal joint comprising:

a first rotary member having a rotary axis;

three trunnions extending from the first member, a roller mounted directly or indirectly on a spherical surface on each trunnion, such surface being provided by the trunnion itself or by a member rotatably mounted on the trunnion, the roller including a cylindrical bore which engages the spherical surface so that each roller can rotate, tilt and slide relative to its supporting trunnion, the centers of the spherical surfaces on all the trunnions lying in a plane perpendicular to said rotary axis; and a second rotary member having a rotary axis, three grooves formed in said second rotary member so as to extend parallel to the rotary axis of the second rotary member, each groove comprising spaced-apart non-trapezoidal track surfaces which extend parallel to the rotary axis of the second member, each roller being engaged with a track surface in one of the grooves, the engagement between each roller and its associated track surface through which torque is being transmitted being at three points which fully determine the roller's orientation with respect to the second member, wherein contact vectors of reaction forces at said three points, when projected on to a common plane perpendicular to the rotary axis of the first member, form a triangle, wherein the contact vector of the force between the roller and the spherical surface, when projected onto said common plane, intersects two sides of the triangle formed by the projected contact vectors of the reaction forces acting at the radially innermost and radially outermost of said points, the radial positions of said points being measured with respect to the rotary axis of the second member, and wherein, when the joint is transmitting torque, each roller is only in contact with the track surface through which the torque is being transmitted.

7. A joint according to claim 6 wherein two of said contact vectors of the reaction forces, when projected on to said common plane, intersect on a plane of symmetry containing the rotary axis of the second member, said two contact vectors being one of the reaction forces acting at the radially innermost or radially outermost of said points and the contact vector of the reaction force acting at the radially intermediate point.

8. A joint according to claim 6 wherein a first track surface contacting the radially innermost point and the radially intermediate point, or the radially outermost point is cylindrical.

9. A joint according to claim 8 wherein said spaced-apart track surfaces on each side of a respective groove are parts of the same cylinder.

10. A joint according to claim 8 wherein the radially innermost or radially outermost point which is not on the first track surface is on a second track surface which is cylindrical and is on the same side of a plane of symmetry containing the rotary axis of the second member.

11. A joint according to claim 10 wherein the first and second track surfaces have a common tangent where they meet.

12. A joint according to claim 6 wherein, when the joint is transmitting torque, the rotary axis of each roller is tilted with respect to a plane of symmetry of its associated tracks.

13. A joint according to claim 12 wherein, when the direction of torque transfer through the joint reverses, each roller moves into contact with a track surface through which torque is then being transferred and tilts about an axis parallel to the rotary axis of the second member until its orientation is determined by said three-point contact.

14. A joint according to claim 13 wherein the tilt movement of each roller is opposite to the direction of rotation of the first member after the direction of torque transfer has been reversed.

15. A joint according to claim 6 wherein the track surfaces in each groove are symmetrical with respect to a plane of symmetry containing the rotary axis of the second member.

16. A joint according to claim 6 wherein each trunnion has a part spherical surface engaged with a cylindrical bore of an inner rotary member on which the roller is rotatably mounted.

17. A joint according to claim 6 wherein each trunnion has a cylindrical surface on which is rotatably mounted an inner first roller having a spherical outer surface engaged with a cylindrical bore of the roller.

18. A joint according to claim 6 wherein all the contacts between a respective roller and its associated tracks have, between them, at least two identifiable radii of curvature where they touch.

* * * * *